United States Patent
Schaller

(10) Patent No.: US 11,387,751 B2
(45) Date of Patent: Jul. 12, 2022

(54) DEVICE FOR ROTATIONAL SPEED-DEPENDENT BRAKING TORQUE CONTROL FOR ELECTRICAL MACHINES EXCITED BY PERMANENT MAGNETS

(71) Applicant: KNORR-BREMSE Systeme fuer Nutzfahrzeuge GmbH, Munich (DE)

(72) Inventor: Sebastian Schaller, Langweid (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/256,135

(22) PCT Filed: Jun. 24, 2019

(86) PCT No.: PCT/EP2019/066637
§ 371 (c)(1),
(2) Date: Dec. 24, 2020

(87) PCT Pub. No.: WO2020/002211
PCT Pub. Date: Jan. 2, 2020

(65) Prior Publication Data
US 2021/0226563 A1  Jul. 22, 2021

(30) Foreign Application Priority Data
Jun. 28, 2018 (DE) .................. 10 2018 210 552.9

(51) Int. Cl.
*H02P 3/22* (2006.01)
(52) U.S. Cl.
CPC ..................................... *H02P 3/22* (2013.01)

(58) Field of Classification Search
CPC ...... H02P 3/22; H02P 3/00; H02P 3/26; B60L 7/00
(Continued)

(56) References Cited

U.S. PATENT DOCUMENTS

| 3,153,182 A | 10/1964 | Choudhury |
| 4,990,837 A * | 2/1991 | Ishitobi ..................... H02P 3/22 |
| | | 318/400.42 |

(Continued)

FOREIGN PATENT DOCUMENTS

| DE | 10 2015 200 284 B3 | 10/2015 |
| DE | 10 2016 216 498 A1 | 3/2018 |

(Continued)

OTHER PUBLICATIONS

International Search Report (PCT/ISA/210) issued in PCT Application No. PCT/EP2019/066637 dated Sep. 26, 2019 with English translation (four (4) pages).

(Continued)

*Primary Examiner* — Jorge L Carrasquillo
(74) *Attorney, Agent, or Firm* — Crowell & Moring LLP

(57) ABSTRACT

A device for speed-dependent braking torque control for electrical machines excited by permanent magnets includes a switching device deliberately short-circuits the electrical machine. The switching device is controlled as a function of an induced voltage generated by the electrical machine. If the induced voltage falls below a defined value, the switching device reverses the short-circuited state of the electrical machine to cause the braking torque to reduce to zero and the speed to increase again. The speed can thus be controlled within a range by alternately opening and closing the switching device.

12 Claims, 2 Drawing Sheets

Figure 1:
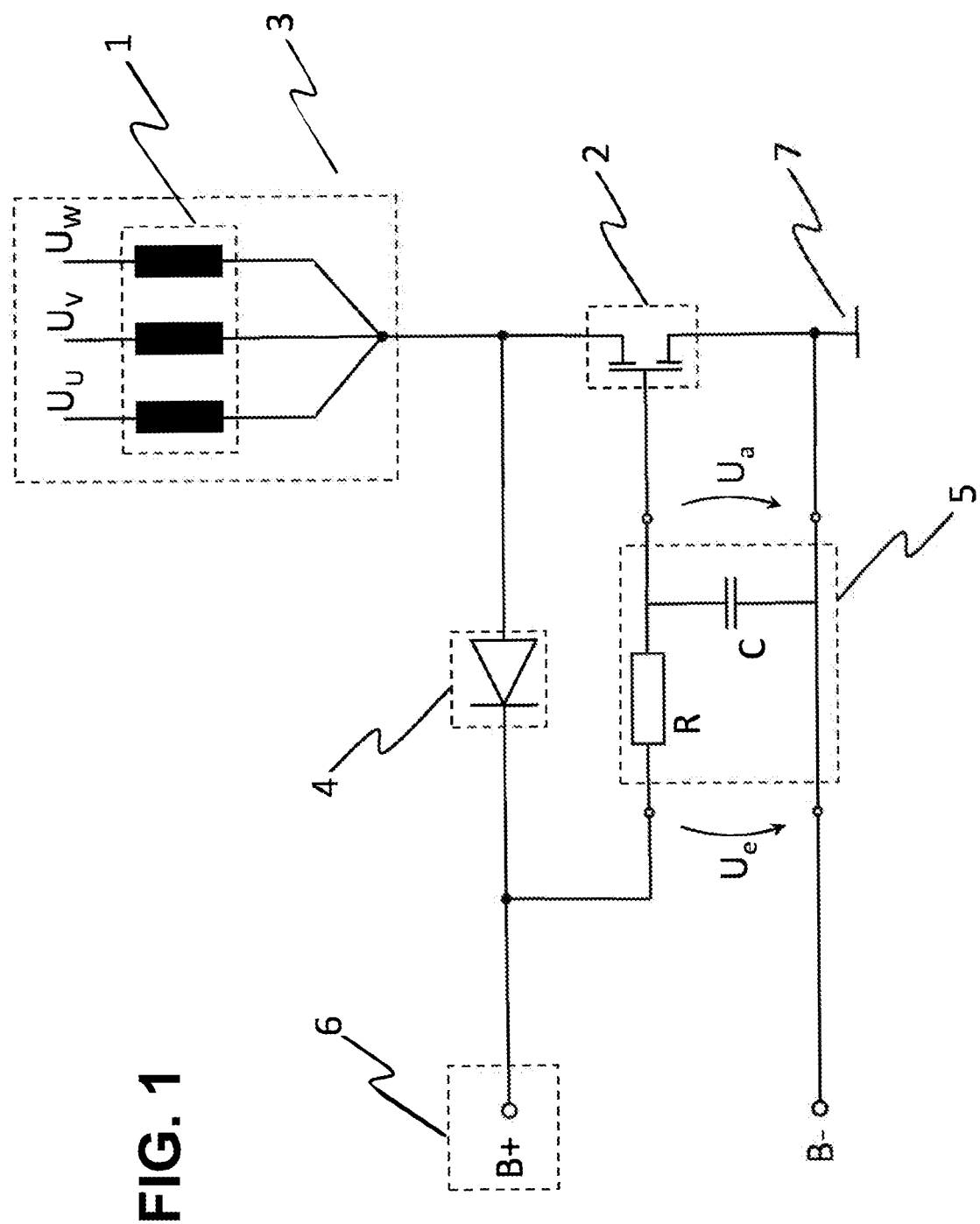

(58) Field of Classification Search
USPC .......................................................... 318/362
See application file for complete search history.

(56) References Cited

U.S. PATENT DOCUMENTS

| | | | |
|---|---|---|---|
| 2012/0275069 A1 | 11/2012 | Dooley | |
| 2014/0156130 A1* | 6/2014 | Ogawa | B60L 7/003 903/903 |
| 2018/0271730 A1* | 9/2018 | Brosnan | A61G 7/015 |
| 2021/0126560 A1* | 4/2021 | Yamamoto | H02P 6/24 |

FOREIGN PATENT DOCUMENTS

| | | | |
|---|---|---|---|
| EP | 1783309 A2 * | 5/2007 | ................ H02P 3/12 |
| EP | 3 245 728 B1 | 9/2019 | |
| FR | 2975241 A1 * | 11/2012 | ............ G05B 15/02 |
| JP | 04334991 A * | 11/1992 | |

OTHER PUBLICATIONS

German-language Written Opinion (PCT/ISA/237) issued in PCT Application No. PCT/EP2019/066637 dated Sep. 26, 2019 (five (5) pages).

German-language Office Action issued in German Application No. 10 2018 210 552.9 dated May 2, 2019 (five (5) pages).

\* cited by examiner

DEVICE FOR ROTATIONAL SPEED-DEPENDENT BRAKING TORQUE CONTROL FOR ELECTRICAL MACHINES EXCITED BY PERMANENT MAGNETS

BACKGROUND AND SUMMARY OF THE INVENTION

The present subject matter relates to a device for rotational speed-dependent braking torque control for electrical machines, which are excited by permanent magnets and can be operated both as a motor and as a generator.

In machines which are excited by permanent magnets, the rotor of the machine bears permanent magnets which are attracted or repelled by an electrical field which is generated by three winding strands U, V, W, which are offset by 120°. The electrical field of the winding strands is generated here by energization with three-phase AC current, wherein the three phases are also offset by 120°, and in each case a winding strand is energized by a phase. The field of the stator which therefore rotates generates a rotation movement of the rotor through the orientation of the permanent magnets with respect to the electrical field.

The control of the rotational speed of electrical machines excited by permanent magnets is generally ensured by means of the frequency of the voltage supply. If the frequency of the voltage is increased, the rotational speed of the electrical machine also increases. If the electrical machine is to be braked, the frequency of the voltage supply is reduced, as a result of which the rotational speeds of the electrical field of the stator and therefore also of the rotor become slower.

The control of the rotational speed and therefore the control of the braking torque of conventional systems are therefore dependent on an external voltage supply. If this collapses, the rotational speed of the electrical machine cannot be controlled, which is problematic in particular in situations in which the rotational speed increases as a result of an external effect.

For example, in the case of electrically activated clutch actuator systems, control of the braking torque when the voltage supply is turned off is highly significant since abrupt closing of the clutch can be prevented in this way.

The object of the present subject matter is therefore to make available a braking torque controller which applies a braking torque to the rotor of the electrical machine as a function of the rotational speed, without requiring an external voltage supply in this context.

According to the present subject matter, the object is achieved with a device which has a switching element which in the conductive state short-circuits an electrical machine and therefore a braking torque on the rotor of the electrical machine is generated. The switching element is controlled here as a function of the induced voltage which is generated in the electrical machine itself. The switching element may be a circuit, a device, transistor, or the like that electrically conducts at least one input to at least one output. The induced voltage is caused here by the rotating field of the permanent magnets in the winding strands of the electrical machine and is therefore dependent on the rotational speed of the rotor.

By controlled switching of the switching element it is therefore possible to carry out rotational speed-dependent control of the braking torque without having to rely on an external power supply here. This constitutes an enormous benefit in terms of safety since a controllable braking torque controller is ensured even if the voltage supply fails.

In an advantageous embodiment, in the conductive state the switching element short-circuits the motor phases of the electrical machine preferably to ground, to the voltage supply or to one another.

In embodiments which are to be preferred, the switching element is for this purpose configured in the conductive state to short-circuit the motor phases of the electrical machine to ground, to the voltage supply or to one another.

In an advantageous embodiment, a blocking element which performs the function of a rectifier is used to rectify the induced voltage which is generated in the electrical machine.

Furthermore, preferably a delay element is provided which serves to transmit an input voltage $U_e$ in a targeted fashion such that the output voltage $U_a$ of the delay element can be used better as a control voltage for a switching element. In order to achieve this, the input voltage $U_e$ is delayed and/or smoothed by the delay element.

The delay element is preferably embodied here as a PT1 element (first-order lag element). A simple shape of a PT1 element which can be used is here an RC element, composed of a resistor and a capacitor.

The output voltage of the delay element therefore preferably constitutes the control voltage for the switching element.

Since the system only has to carry out rotational speed-dependent braking torque control when the applied voltage fails, the device is preferably configured in such a way that the control of the switching element as a function of the induced voltage is active only when the voltage supply fails. This is ensured by applying the voltage supply to the system, since current can be induced by the electrical machine only if there is no voltage present from the voltage supply. This ensures that the braking torque control cannot intervene when the voltage supply is applied.

Furthermore, a voltage-limiting device, such as for example a Z diode (e.g., Zener diode), is arranged downstream of the rectification of the induced voltage which is generated in the electrical machine. In this way, possibly occurring excessively high voltage peaks which could damage elements of the control circuit can be avoided.

In addition, the control of the switching element is preferably implemented by means of its hysteresis which is characterized by a first threshold value $U_{SC}$ and a second threshold value $U_{SO}$ which is lower than the first threshold value $U_{SC}$. If the output voltage of the delay element reaches the first threshold value $U_{SC}$, the switching element closes and therefore short-circuits the electrical machine, as a result of which a braking torque is generated. If the output voltage $U_a$ undershoots the second threshold voltage $U_{SO}$, the switching element opens and ends the short-circuited state of the electrical machine.

In one advantageous embodiment, the two threshold values $U_{SC}$ and $U_{SO}$ can be adapted to the respective requirements by a threshold value controller which is part of the switching element. In this way it is possible to set the braking torque which is averaged over a certain period of time and therefore to achieve a greater or lesser reduction in the rotational speed and also to implement braking of the rotor to the stationary state.

The present subject matter is preferably used in an electrically activated clutch actuator system to be able to prevent the rapid closing of the clutch when the voltage supply is turned off by the braking torque controller.

BACKGROUND AND SUMMARY OF THE INVENTION

Figure 2:
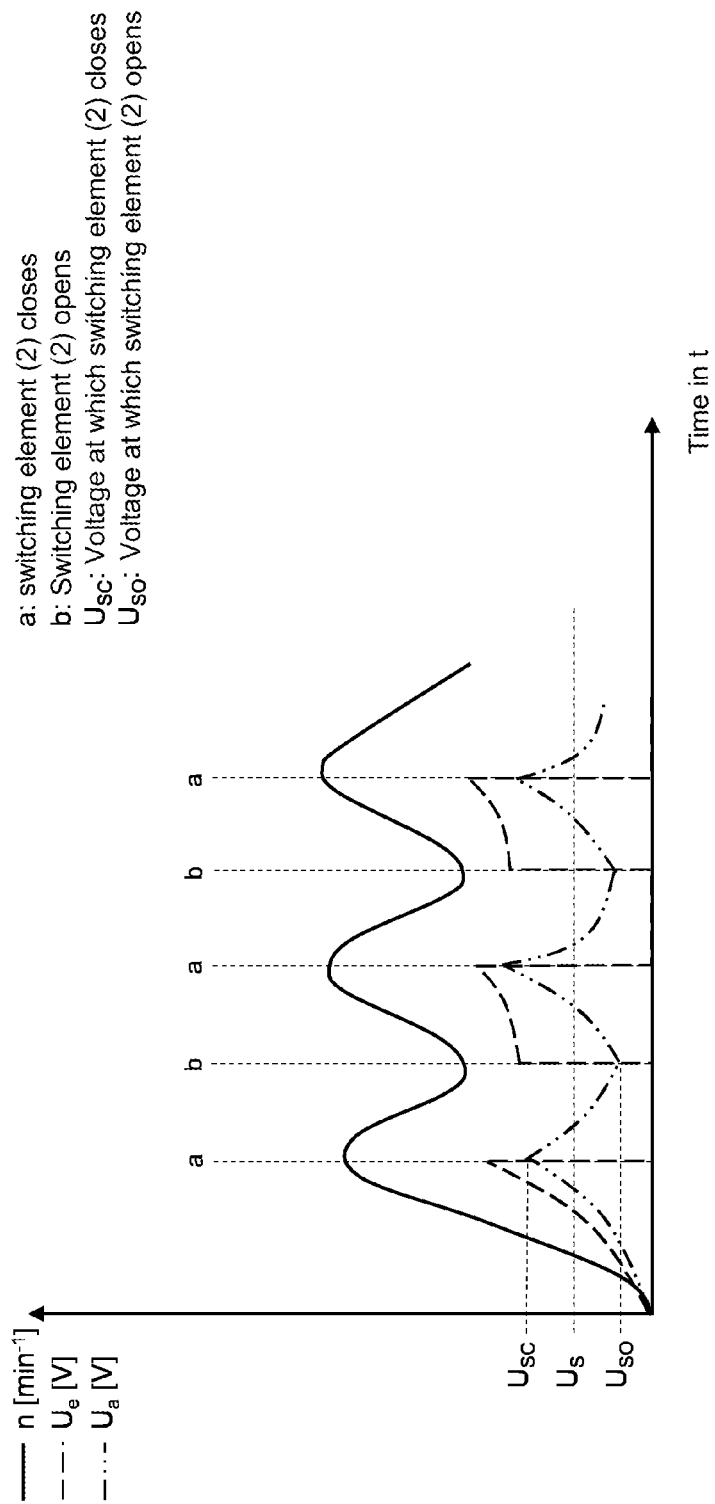

FIG. 1 shows a schematic design of an embodiment of the present subject matter, and FIG. 2 shows a diagram explaining the method of functioning of the present subject matter through the illustration of the relationships between the input voltage, the output voltage and the rotational speed of the electrical machine.

BACKGROUND AND SUMMARY OF THE INVENTION

The explained embodiment of the present subject matter is configured to keep the rotational speed of an electrical machine in a defined corridor after a drop in the voltage even though power is fed to the electrical machine through an external effect, and therefore the rotational speed of the electrical machine would increase without the braking torque control. An application example of this scenario would be, for example, the failure of the power supply of an electrical-machine-powered vehicle which is travelling downhill.

FIG. 1 shows the schematic design of this embodiment of the present subject matter. A voltage supply 6 is provided and supplies three motor phases 1 of an electrical machine 3 with a voltage. A switching element 2 short-circuits the electrical machine 3 as a function of an output voltage $U_a$ of an upstream delay element 5 composed of a resistor R and a capacitor C, by producing an electrical connection between the electrical machine and the ground 7. An input voltage $U_e$ is connected to the delay element 5. A blocking element 4 is provided for rectifying the voltage induced by the electrical machine.

If the voltage supply 6 is interrupted, a voltage is induced by the phases 1 of the electrical machine 3. This voltage is rectified in the blocking element 4 and is subsequently connected to the delay element 5. Owing to the transmission ratio of the delay element 5 in the form of a PT1 element, the output voltage $U_a$ of the delay element 5 runs behind the input voltage $U_e$ and is smoothed.

FIG. 2 shows a diagram explaining the method of functioning of the present subject matter through the illustration of the relationships between the input voltage $U_e$, the output voltage $U_a$ and the rotational speed n of the electrical machine. The explanation of the first embodiment of the present subject matter is given on the basis of the consideration of the two FIGS. 1 and 2.

If the voltage supply of the system collapses and the electrical machine 3 is simultaneously subject to an external power supply, the rotational speed of the electrical machine 3 increases. Therefore, the voltage which is induced by the electrical machine 3 also increases, as a result of which the input voltage $U_e$ and the output voltage $U_a$ rise, the latter delayed by the delay element 5. If $U_a$ reaches a defined threshold value $U_{SC}$, the switching element closes and therefore brings about an electrical connection between the electrical machine 3 and the ground 7. The voltage to the control device tends to zero and the rotational speed of the motor drops as a result of the braking torque which is generated in this way.

The voltage is reduced by the delay element 5 as a function of the capacitance of the capacitor and the size of the resistance in the RC element over a defined period of time until the output voltage $U_a$ reaches a previously defined low threshold value $U_{SO}$, and the switching element 2 subsequently disconnects again the electrical connection between the ground 7 and the electrical machine 3. The braking torque tends to zero and the rotational speed of the electrical machine increases again, while the input voltage $U_e$ rises suddenly. This process repeats, as a result of which the rotational speed can be kept in a desired corridor. The braking torque which is applied on average can be set in advance for the entire system through the corresponding selection of the resistance and capacitance.

In another embodiment, in the case of collapse of the voltage supply the device can be used to reduce the rotational speed of the electrical machine 3 in a targeted fashion by applying a braking torque. The design of the system is basically the same as in the exemplary embodiment specified above, except that the switching element 2 has a threshold value controller which can change the threshold values $U_{SC}$ and $U_{SO}$.

In contrast to the example specified above, after the drop in the voltage owing to the lack of an external effect, the rotational speed n of the electrical machine 3 does not increase but rather remains approximately constant minus relatively small frictional losses and remagnetization losses of the windings.

Nevertheless, as in the above embodiment, a voltage is induced in the windings by the constant rotational speed n. Therefore, the threshold value $U_{SC}$ is also reached by the output voltage $U_a$ here, and the electrical machine is short-circuited. In a way analogous to the above embodiment, a braking torque on the rotor is generated and therefore the rotational speed n is reduced. If the output voltage $U_a$ drops to the lower threshold value $U_{SO}$, the switching element cancels the short-circuited state again, and the braking torque at the rotor tends towards zero, as a result of which the rotational speed n stabilizes again and as a result remains constant, but at a lower level than before the switching element first closed.

The voltage which is induced in the windings is then present at the delay element again, as a result of which the input voltage $U_e$ rises suddenly, and the output voltage $U_a$ rises with a delay. Since the input voltage $U_e$ is then lower than before the first closing of the switching element owing to the relatively low rotational speed, it takes longer for the capacitor C of the delay element 5 to be charged, and consequently also for the output voltage $U_a$ to reach the upper threshold value $U_{SC}$, and therefore for the switching element 2 to close a second time.

So that this effect is prevented and a time delay does not occur, the upper threshold value is adapted downward and therefore the switching element is made to close earlier. This setting is performed by the threshold value control unit which in this embodiment is part of the switching element. By analogy to this, the lower threshold value $U_{SO}$ is also reduced, in order also to ensure that the capacitor of the delay element 5 discharges for the same period and therefore that the braking torque is applied for the same period.

By changing the threshold values it is therefore possible, as shown, to set in a variable way the intensity of the reduction in the rotational speed of the electrical machine, which is averaged over a time period, and likewise to implement braking as far as a stationary state. This setting of the threshold value control unit is performed as a function of the user's braking command.

Therefore, a device for rotational speed-dependent braking torque control for electrical machines excited by permanent magnets is disclosed, wherein in the event of an interruption of the voltage supply 6 a switching element 2 short-circuits the electrical machine 3 in a targeted fashion as a function of the induced voltage of the electrical machine 3, and therefore generates a braking torque on the rotor of the electrical machine 3. If the induced voltage undershoots a defined value, the switching element 2 cancels the short-circuited state of the electrical machine 3, as a result of which the braking torque tends to zero and the rotational speed is not reduced. As a result of alternate opening and closing of the switching element 2, the rotational speed n can therefore be throttled in a targeted fashion, or in the case of an external effect on the electrical machine it can be held in a defined corridor, as in the first exemplary embodiment.

LIST OF REFERENCE SYMBOLS

1 Motor phases
2 Switching element
3 Electrical machine
4 Blocking element
5 Delay element
6 Voltage supply
7 Ground
$U_e$ Input voltage
$U_a$ Output voltage
$U_{SC}$ Upper threshold value
$U_{SO}$ Lower threshold value
n Rotational speed of electrical machine

What is claimed is:

1. A device for rotational speed-dependent braking torque control for electrical machines excited by permanent magnets, comprising:
    a switching device which is arranged and configured in a conductive state to short-circuit an electrical machine, wherein
        the switching device is controlled as a function of an induced voltage generated by the electrical machine,
        when a first threshold value of a smoothed and/or a delayed output voltage is exceeded, the switching device short-circuits the electrical machine, and
        when a second threshold value of the delayed and/or smoothed output voltage, which is lower than the first threshold voltage, is undershot, the switching device cancels the short-circuited state of the electrical machine.

2. The device of claim 1, wherein
    the switching device is arranged and configured in the conductive state to short-circuit motor phases of the electrical machine to ground, to a voltage supply, or to one another.

3. The device of claim 1, further comprising:
    a rectifier to rectify the induced voltage generated by the electrical machine to generate a rectified voltage.

4. The device of claim 3, further comprising:
    a delay circuit to transmit the rectified voltage in the delayed and/or the smoothed fashion.

5. The device of claim 3, further comprising:
    a voltage-limiting device arranged downstream of the rectifier to voltage limitation.

6. The device of claim 5, wherein
    the voltage-limiting device is a Zener diode.

7. The device of claim 4, wherein
    the delay circuit is a PT1 circuit.

8. The device of claim 4, wherein
    the output of the delay circuit is electrically connected to a control input of the switching device.

9. The device of claim 7, wherein
    the PT1 circuit is an RC circuit.

10. The device of claim 1, wherein
    the control of the switching device is active as a function of the induced voltage only when a voltage supply fails.

11. The device of claim 1, wherein the switching device further comprises:
    a threshold value controller to set the threshold values of the output voltage in a variable fashion as a function of a braking command.

12. An electrically-activated clutch actuator system comprising the device of claim 1.

* * * * *